Figure 1:
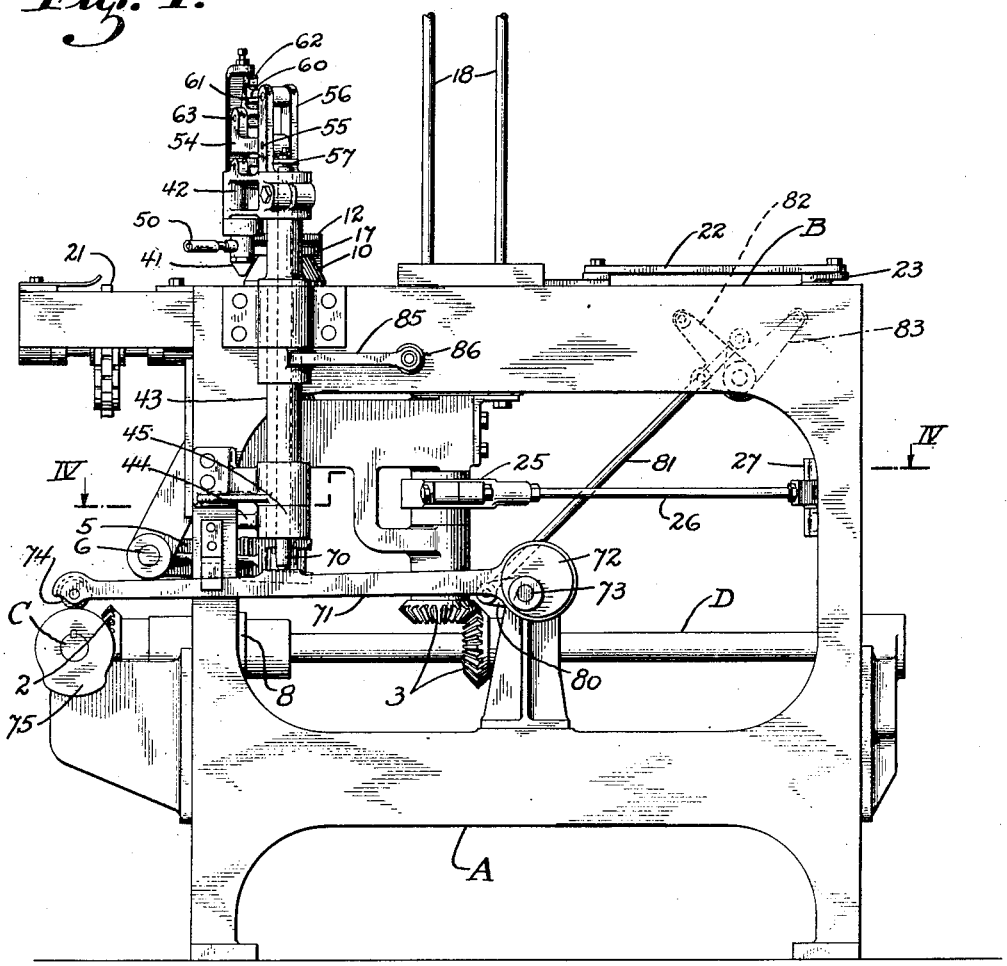

Oct. 10, 1933.   F. KRUEGER   1,929,784
MACHINE FOR LINING CAN ENDS WITH A SEALING COMPOUND
Filed Feb. 10, 1930   5 Sheets-Sheet 1

INVENTOR.
Frank Krueger.
BY
Townsend, Loftus & Abbett
ATTORNEYS.

Oct. 10, 1933.   F. KRUEGER   1,929,784
MACHINE FOR LINING CAN ENDS WITH A SEALING COMPOUND
Filed Feb. 10, 1930   5 Sheets-Sheet 2
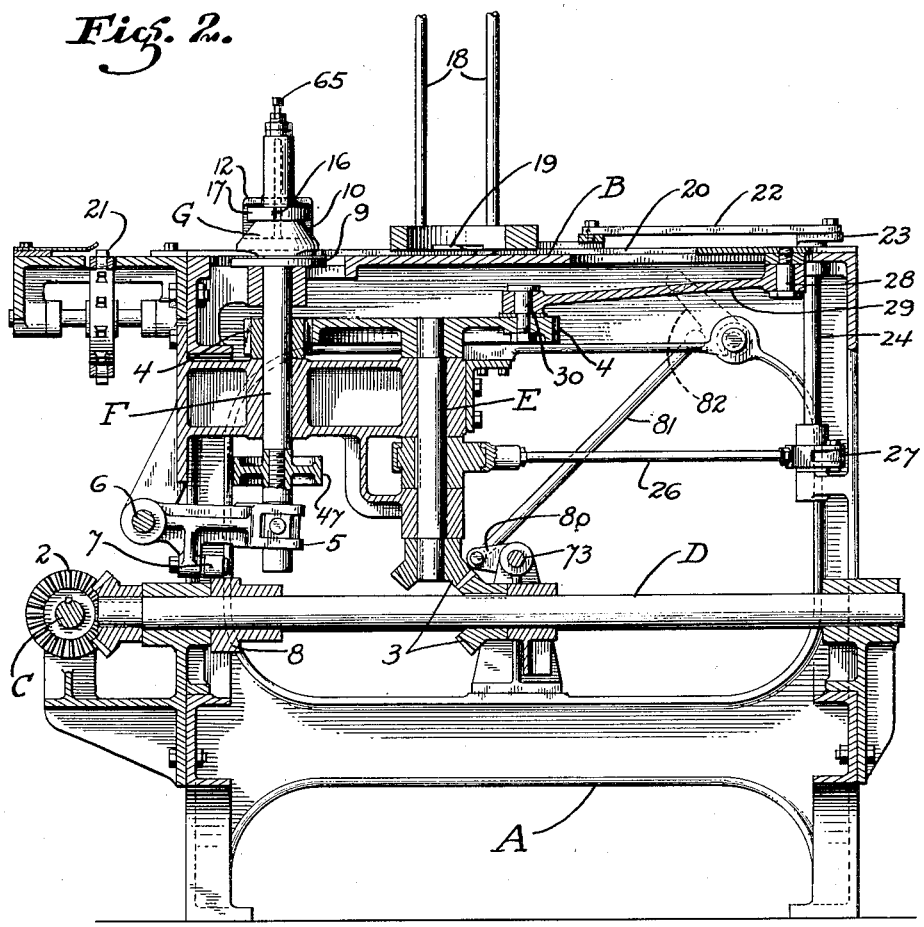
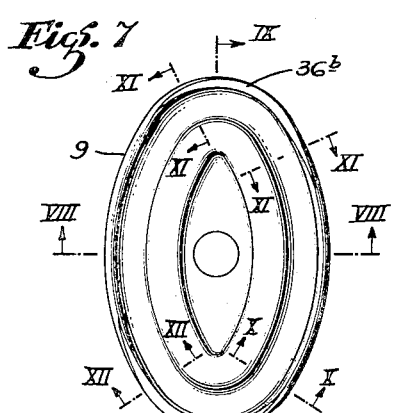
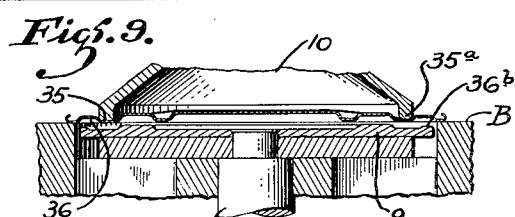
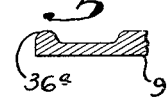
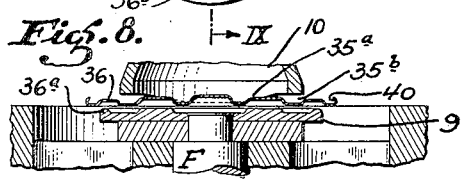
INVENTOR.
Frank Krueger.
BY
Townsend, Loftus & Abbett
ATTORNEYS.

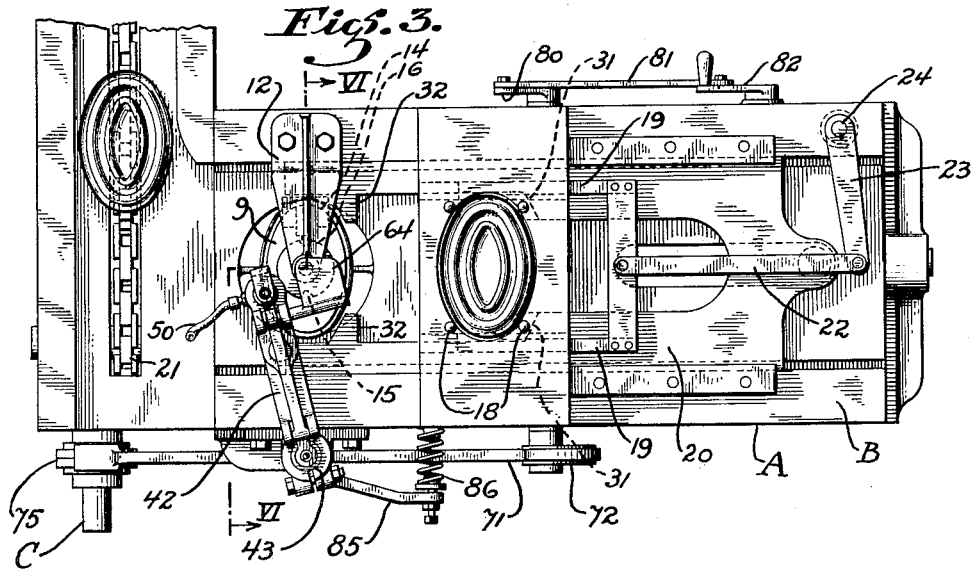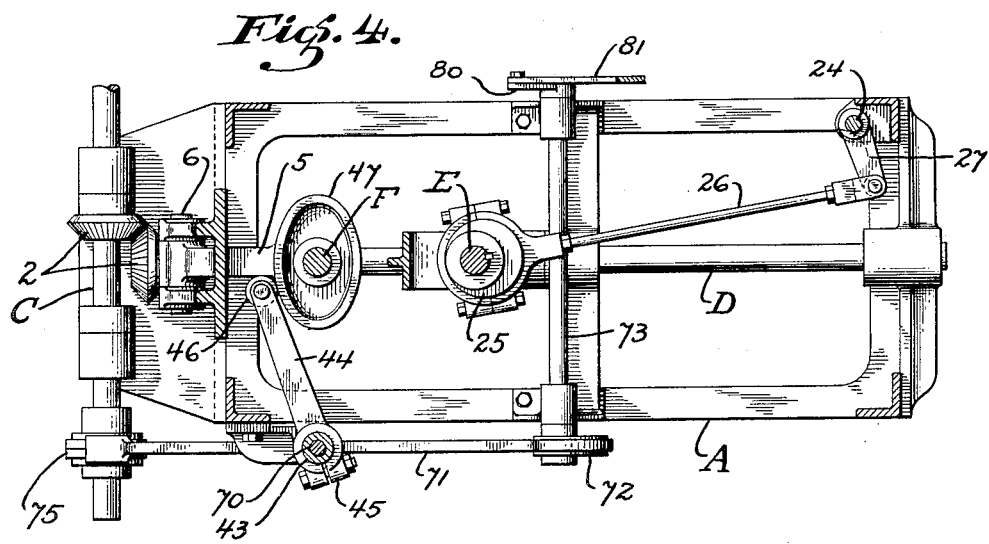

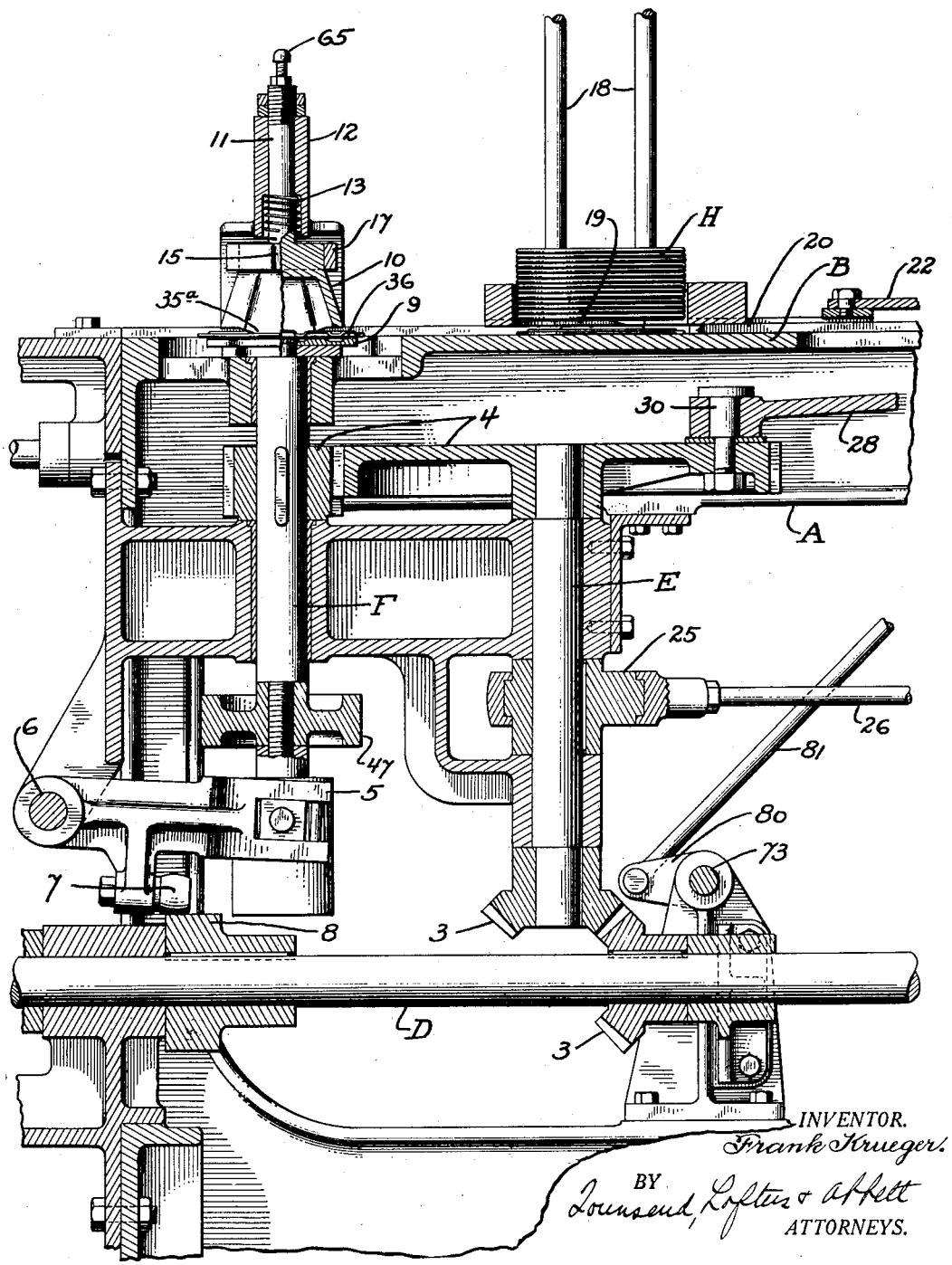

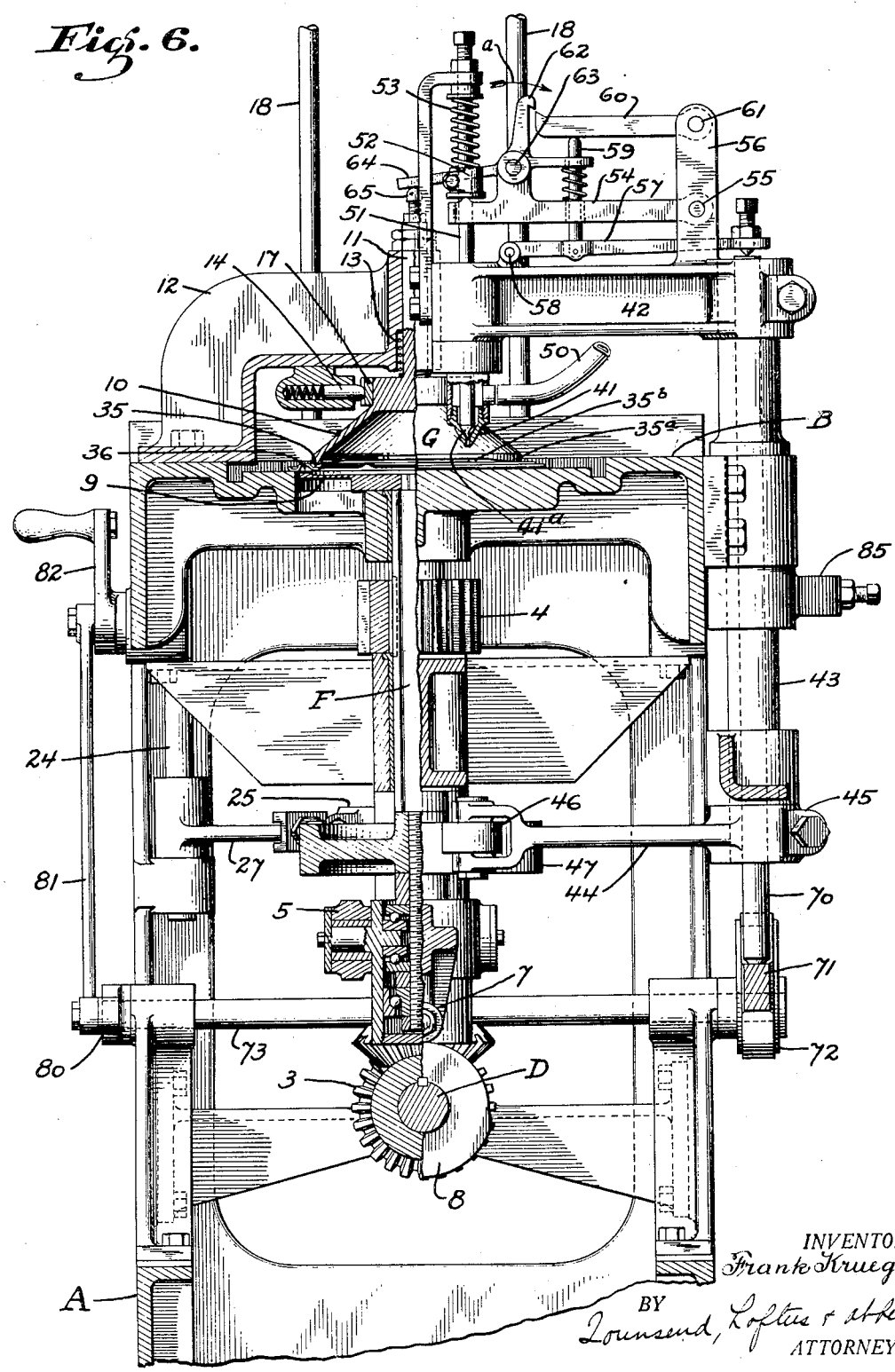

Patented Oct. 10, 1933

1,929,784

UNITED STATES PATENT OFFICE 1,929,784

MACHINE FOR LINING CAN ENDS WITH A SEALING COMPOUND

Frank Krueger, San Francisco, Calif., assignor to Pacific Can Co., San Francisco, Calif., a corporation of Nevada Application February 10, 1930. Serial No. 427,275

12 Claims. (Cl. 113—80)

This invention relates to a machine for lining can ends with a sealing compound and especially to a machine which is adapted for lining oval, square, rectangular or irregular shaped can ends.

The object of the present invention is to generally improve and simplify the construction and operation of machines of the character described; to provide means for automatically delivering oval or irregular shaped can ends one by one to a lining chuck and for removing the ends one by one from the chuck when lined; to provide a valve controlled nozzle whereby a sealing compound is delivered to the flange or an oval or irregular shaped can end; to provide means for rotating the chuck and the can end mounted therein while the nozzle is delivering a sealing compound; to provide means for maintaining the nozzle in alignment with the flange of an oval or irregular shaped can end during the lining operation and while the chuck and can end is being rotated; to provide means for automatically preventing opening of the nozzle when a can end is not delivered to the chuck; to provide a lining chuck comprising upper and lower chuck members; to provide means for transmitting continuous rotation to the lower chuck and intermittent rotation to the upper member of the chuck; to provide means for raising and depressing the lower chuck member during continuous rotation thereof; to provide means for delivering and aligning an irregular shaped can end with relation to the upper chuck before each intermittent rotation thereof and while the lower chuck member is depressed; to provide means whereby the lower chuck is raised while rotating and brought into engagement with the can end and the upper chuck so as to clamp the can end and simultaneously transmit rotary motion to the can end and the upper chuck; and further, to provide means for depressing the lower chuck and for bringing the upper chuck and the can end to a stop when substantially one and one-half revolutions have been transmitted to the upper chuck and can end.

The invention is shown by way of illustration in the accompanying drawings, in which—

Fig. 1 is a side elevation of the machine,
Fig. 2 is a central vertical longitudinal section of the same,
Fig. 3 is a plan view,
Fig. 4 is a horizontal section taken on line IV—IV of Fig. 1,
Fig. 5 is an enlarged section similar to Fig. 2 showing the chuck spindle, the can end feeding device and the mechanism operating the same,
Fig. 6 is an enlarged central vertical cross section taken on line VI—VI of Fig. 3.
Fig. 7 is a plan view of the lower chuck,
Fig. 8 is a vertical section showing the relative positions of the upper and lower chuck members when engaging a can end,
Fig. 9 is an enlarged section similar to Fig. 8 showing a can end substantially engaged by the chuck members, and
Figs. 10, 11 and 12 are enlarged fragmentary sections of the rim portion of the lower chuck.

Referring to the drawings in detail and particularly Figs. 1, 2, 3 and 5, A indicates a main frame on which is supported a table or top portions generally indicated at B. Journalled crosswise of the frame is a drive shaft C and journalled longitudinally of the frame and substantially centrally thereof is a driven shaft D, this shaft being driven from the drive shaft through bevel gears such as indicated at 2. Journalled vertically in the frame is a driven shaft E, this shaft being driven from the driven shaft D through bevel gears 3. Also journalled vertically in the frame is a spindle generally indicated at F, this spindle being continuously driven from the driven shaft E by spur gears indicated at 4. The spindle F is not only continuously driven but reciprocal motion is also transmitted thereto, this motion being transmitted through a rocker arm 5 pivotally mounted on the frame as at 6. This rocker arm carries a roller 7 and this is engaged by a cam 8 secured on shaft D. The shafts indicated at C, D and E are all driven at the same speed as one to one gear ratios are employed at the points indicated at 2 and 3. Spindle F is however driven at a higher speed due to the gear ratio shown at 4, the gear ratio being approximately four to one. Hence one reciprocal movement is transmitted to the spindle F during each four revolutions as the vertical reciprocal motion is transmitted through the cam 8 secured on shaft D.

The spindle F operates a chuck generally indicated at G. This chuck consists of two parts indicated at 9 and 10, see Figs. 5 and 6. The chuck member 9 will hereinafter be referred to as the lower chuck and the chuck member 10 as the upper chuck. The lower chuck is continuously rotated as it is keyed or otherwise secured on the upper end of the spindle F but the upper chuck is only intermittently rotated and then only one and one-half revolutions as will hereinafter be described. The upper chuck is secured on the lower end of a spindle 11 journalled in a bearing bracket 12 and the upper chuck is normally held in a depressed position by means of a spring 13 and it may furthermore be stated that it is normally retained against rotation by means of a spring detent such as shown at 14, see Fig. 6, which engages one or another of a pair of notches indicated at 15 and 16 formed in a collar 17 secured on the upper end of the upper chuck. The can ends to be lined are indicated at H and they are placed in a magazine of the usual construction, that is between a number of guide rods such as indicated at 18. They are removed from the magazine one by one and are delivered one by one to the chuck where they are engaged by the chuck members and rotated one and one-half revolutions and then discharged. During the one and one-half revolutions the sealing compound is deposited in the can end flange and this is accomplished as will hereinafter be described.

The can end feeding mechanism employed in the present instance is more or less standard and hence will only be briefly described. The feeder consists of two parts, first, a pair of knives such as shown at 19 which drop the can ends one by one from the magazine down on the table top indicated at B. The second part of the feeding mechanism consists of a sliding plate 20 which accomplishes two purposes; first, that of moving a can end released from the stack H to the chuck; and secondly, moving the can end from the chuck to a discharge conveyor generally indicated at 21. The knives 19 together with the plate 20 are reciprocated and once during each reciprocal movement a can end is released from the stack and advanced to the chuck and simultaneously a can end is removed from the chuck and delivered to the conveyor 21. Reciprocal movement is transmitted to the knives 19 through a link 22 which is connected to a crank arm 23, this arm is secured on the upper end of a vertically disposed shaft 24 and this is oscillated through means of an eccentric 25 secured on shaft E, the eccentric being connected with shaft 24 through a link 26 and a crank arm 27 secured on the lower end of the shaft. The sliding plate 20 is reciprocated through means of a connecting rod 28, see Figs. 2 and 5, one end of the connecting rod being pivotally secured to the lower face of the sliding plate as indicated at 29 and the opposite end being secured to a crank pin 30 secured on the upper face of the larger gear 4. Hence during each revolution of shaft E one reciprocal movement is transmitted to the knives 19 and the sliding plate 20. The eccentric 25 is, however, set in advance of the crank pin 30 so that the can end is released from the magazine and dropped in position to be advanced to the chuck when movement is transmitted to the sliding plate 20.

When the sliding plate 20 advances the can end dropped from the magazine is engaged by a pair of rear lugs such as shown at 31, see Fig. 3, and the can end is advanced by these lugs to the chuck G. A can end previously delivered to the chuck is simultaneously engaged by a pair of front lugs 32 and is advanced from the chuck to the conveyor 21. The lower member 9 of the chuck is depressed during this operating hence leaving the can end in the chuck free to be removed and at the same time permitting the insertion of the can end which is being advanced from the magazine.

It was previously stated that the lower chuck was continuously rotated hence it is essential that the lower chuck be depressed when a can end is inserted. This is readily accomplished as the upper chuck is stationary at that time due to the fact that it is held against rotation by the spring latch or detent 14, and also, due to the fact that it is only rotated when a can end is introduced and the lower chuck is raised to clamp the can end between the two chuck members, hence the upper chuck is only rotated during this period and is held against rotation when the lower chuck is depressed as it can only be driven through the means of an interposed can end and the lower chuck.

Before proceeding further it should be remembered that the present machine is particularly intended for lining can ends of irregular shape such as oval, square, rectangular shaped can ends, etc., and in order to have the nozzle delivering the compound follow the irregular shaped groove in the can end flange, it is important, that the can ends be held in the chucks with their centers in alignment with the chuck center, and with their major and minor axes running in a predetermined direction in relation to the chucks. In the present instance the chucks are shaped to receive and handle oval shaped ends. Oval ends are provided with annular grooves such as shown at 35 and 36, see Figs. 6 and 9, hence the lower flange of chuck 10 is provided with projections such as shown at 35a, see Figs. 8 and 9, at each end which are adapted to enter the annular groove 35 and thereby secure the end when introduced by the feeder 20. The sides of the lower flange of chuck 10 are relieved as indicated at 35b hence permitting a can end to be readily introduced as the chuck 10 is held in its depressed position by means of spring 13, that is, the chuck will be slightly raised as the can end is introduced as it will enter through the relieved side 35b and engage the projections 35a and thereby raise the upper chuck sufficiently to cause the projection 35 to ride over the can end flange and then seat themselves in the annular groove 35. The projections 35a are formed on opposite ends of the then stationary chuck 10 and the can end having its axis coinciding with the axis of the chuck is thus grasped between the table and the chuck at two points and held securely in the proper position and in the proper direction in relation to the chuck 10, then the lower chuck moves upwardly into clamping engagement.

A plan view of the lower chuck is shown in Fig. 7. It is provided with an exterior bead or raised portion 36a which is adapted to enter the annular groove 36 formed in the can end. The end portions of the bead are however relieved or ground off as indicated at 36b. These relieved portions align with the annular groove 36 during the upward movement of the lower chuck and as the lower chuck is rotating at the same time the annular bead 36a enters with a screw action being completely seated so as to clamp the can end between the two chuck sections when the lower chuck finally reaches its limit of upward movement. The moment the can end is clamped and completely engaged one and one-half revolutions will be imparted as the length of the cam indicated at 8 is such that the spindle and lower chuck will be lowered just prior to the completion of one and one-half revolutions. The upper chuck will at the same time be engaged by the spring detent 14 and will thus be locked and as the lower chuck has moved out of driving engagement with the can end and the upper chuck, both the upper chuck and the can end comes to rest and will at that time be removed by the front lugs 32 of sliding plate 20.

It may be here noted, that the absence of a great number of rapidly revolving parts, having a great moving mass, and subjected to rapid and frequent starting and stopping, is a desirable advantage, permitting the rapid running of the machine. In the construction above described, the lower chuck 9 with all the mechanism for its rotation is running with a continuous and uniform speed, and the only part having an intermittent motion is the upper chuck, which, being subjected to very little strain, and being of small dimensions, may be made very light, requiring but a small force for its starting and stopping.

During the one and one-half revolutions transmitted to the chuck the sealing compound is deposited in the can end flange indicated at 40. This is accomplished by means of a nozzle 41, see Figs. 1, 3, 4 and 6. The nozzle is carried by an arm 42 secured on a shaft 43 journalled at one side of the frame. This shaft is oscillated by means of an arm 44 secured on the lower end of shaft 43 as at 45. The inner end of the arm 44 is provided with a roller 46 and this engages a cam 47 secured on the lower end of the spindle shaft F. Cam 47 has a contour identical to that of the oval can end to be lined and as the roller 46 follows the contour of the cam 47 shaft 43 will oscillate and transmit a similar motion to the arm 42 and the nozzle 41 causing the nozzle 41 to move radially with relation to the chuck and align with the can end flange indicated at 40 during the one and one-half revolutions transmitted to the can end while in the chuck.

The sealing compound is supplied to the nozzle 41 from any suitable source of supply through a flexible hose 50, the supply of the sealing compound being controlled by a valve 41a, which seats in the nozzle. The valve is actuated by a stem 51, that is, it is raised or lowered by the stem and the stem is provided with a collar 52 engaged by a spring 53 which exerts pressure to normally retain the valve in the closed position. The lower face of the collar is however engaged by an arm 54 which is pivotally secured as at 55 in a bracket 56 secured to arm 42. A second arm 57 is pivotally secured on arm 42 at the point indicated at 58 and this arm carries a plunger 59 which engages a pawl 60 pivotally secured as at 61 in the upper end of the bracket 56. A latch 62 is pivotally mounted as at 63 on the arm 54, this latch is provided with an extension arm 64 which is engaged by a pin 65 secured in the upper end of the spindle 11 which carries the upper chuck member 10. Pin 65 functions to prevent opening of the valve controlling the nozzle 41 if no can end is delivered to the chuck, so as to prevent waste of the sealing compound and soiling of the table and chuck surfaces, etc., that is, if a can end is introduced between the chuck members, pin 65 will raise in unison with the upper chuck a predetermined distance and if a can end is not introduced the distance pin 65 raises will be less. It it is raised its maximum distance, that is, when a can end is inserted it engages arm 64 and rocks latch 62 in the direction of arrow $a$ so that it will be engaged by the latch 60. If a can end is not introduced the rocking movement transmitted to the latch 62 is not sufficient to cause engagement with the latch 60 and the valve controlled by the valve stem 51 will then remain seated. This is due to the fact that arm 54 cannot be raised unless latch 62 is engaged by the pawl 60. Pawl 60 is raised once during each one and one-half revolutions of the chuck through means of pin 59, and arm 57 is in turn raised once during each one and one-half revolutions of the chuck through means of vertically disposed shaft 70 which passes through the shaft 43. That is, shaft 43 is tubular to accomodate a shaft or pusher rod 70, the lower end of pusher rod engaging a lever 71, see Fig. 1, which is pivoted at one end on an eccentric 72 secured on a cross shaft 73 which is manually actuated. The opposite end of arm 71 is provided with a roller 74 and this engages a cam 75 secured on the main drive shaft C, hence during each revolution of shaft C cam 75 engages the roller 74 and swings arm 71 about eccentric 72 which functions as a pivot. This motion is transmitted through the pusher rod or shaft 70 which engages the outer end of arm 57, this in turn raises pin 59 and pawl 60. If latch 62 aligns with pawl 60 arm 54 will be raised and as arm 54 engages collar 52 on the valve stem 51 the valve will be raised and the sealing compound will be free to discharge through the nozzle 41 and will be directed thereby into the can end flange. On the other hand if no can end is introduced latch 62 fails to align with the pawl and the valve controlling nozzle 41 will remain closed.

Shaft 73 carrying the eccentric 72 is best shown in Figs. 1 and 4. The eccentric 72 is secured on one end thereof and a crank arm 80 is secured on the opposite end. This crank is connected through a link 81 with a hand operated lever 82. When this lever assumes the position shown in Fig. 1 arm 71 will actuate the pusher rod or shaft 70 but if lever 82 is swung to the dotted line position indicated at 83 shaft 73 will be rotated so as to cause the eccentric 72 to assume a position substantially opposite to that indicated in Fig. 1, thereby lowering the pivot point of arm 71 to such an extent as to maintain the arm out of engagement with the pusher rod 70, hence means are provided whereby the nozzle 41 may be shut off both automatically and manually. By referring to Fig. 3 it will be noted that shaft 43 is provided with a crank arm 85 and that this is engaged by means of a spring 86. The arm and spring serve an important function to-wit, that of maintaining roller 46 in constant engagement with the contour cam 47. This is imporant in a high speed machine as the roller might tend to leave or jump the contour cam 47 at the high points and thus permit nozzle 41 to move out of alignment with the can end flange but due to the tension of spring 86, the contour cam is closely followed and any disalignment between the nozzle and the can end flange is prevented.

Another important feature to be considered in connection with the introduction of the sealing compound is the fact that one and one-half revolutions is transmitted to the chuck and the can end held thereby while the sealing compound is being introduced. The one and one-half revolutions insures overlapping of the compound, that is, the sealing compound employed is more or less viscous depending upon room temperature, etc., and is usually fed to the valve or nozzle under comparatively low pressure, hence when the valve opens the can end rotates a fraction of a revolution before any sealing compound actually reaches the can end flange. Hence the necessity of imparting more than one revolution to the can end during the application or delivery of the sealing compound.

The manual control mechanism to-wit, the lever 82, the link 81 and the eccentric 72 whereby the pivotal end of lever 71 may be raised or lowered forms the subject matter of a separate application and it is for this reason not claimed in the present application.

Having thus described my invention, what I claim and desire to secure by Letters Patent is—

1. In a machine of the character described, a spindle, a chuck adapted to be rotated thereby, means for delivering a flanged irregular shaped can end to the chuck, an arm pivotally mounted adjacent the chuck, a nozzle mounted on the free end of the arm, means for guiding the arm so as to maintain the nozzle in alignment with the flange of the can end during rotation thereof, a valve in the nozzle, a second arm pivitally mounted at one end of the first named arm and engageable with the valve to open the same, a third arm pivotally mounted on the first named arm, a pusher rod engageable with said third named arm to impart movement thereto, a pin on said third named arm, a pawl adapted to be engaged thereby, and a latch carried by the second named arm and movable into and out of engagement with the pawl.

2. In a machine of the character described, a spindle, a chuck adapted to be rotated thereby, means for delivering a flanged irregular shaped can end to the chuck, an arm pivotally mounted adjacent the chuck, a nozzle mounted on the free end of the arm, means for guiding the arm so as to maintain the nozzle in alignment with the flange of the can end during rotation thereof, a valve in the nozzle, a second arm pivotally mounted at one end of the first named arm and engageable with the valve to open the same, a third arm pivotally mounted on the first named arm, a pusher rod engageable with said third named arm to impart movement thereto, a pin on said third named arm, a pawl adapted to be engaged thereby, a latch carried by the second named arm and movable into and out of engagement with the pawl, and means for maintaining the latch out of engagement with the pawl if a can end is not delivered to the chuck.

3. In a device of the character described, a continuously rotating lower chuck for the reception of irregularly shaped can ends, a feed mechanism cooperating with said chuck for feeding can ends thereto one at a time placing them with their major axes pointing in a definite direction relative to the chuck, and means for driving said feed mechanism in synchronism with said chuck to feed can ends thereto at predetermined intervals of rotation of the chuck, whereby the chuck will occupy the same position relative to each can end.

4. In a device of the character described, comprising a continuously rotating lower chuck for the reception of irregularly shaped can ends having non-circular grooves formed in the surface thereof, said chuck being provided with non-circular ridges for registry with said grooves in the can ends to maintain them in a predetermined position relative to said lower chuck, a corresponding upper chuck for engagement with a can end on the lower chuck and non-circular projections on said upper chuck also engageable with said can end grooves.

5. In a can end handling machine, a continuously rotating lower chuck engageable with a can end to rotate it and a normally stationary upper chuck engageable with a can end on the lower chuck and adapted to rotate with the lower chuck and can end, and means for stopping rotation of the upper chuck in a predetermined position when it is released.

6. In a can end handling machine, a chuck for engaging and rotating can ends, a second chuck adapted to be engaged and rotated by the can end on the first chuck and detent means engageable with the second chuck to cause it to normally cease rotation when in a predetermined position.

7. In combination with a nozzle for delivering fluid to can ends supported on a chuck, a valve in the nozzle, an arm pivotally mounted adjacent the nozzle and engageable with the valve to open it, a second pivoted arm, means for oscillating said second arm, a pin on said second arm, a pawl adapted to be engaged thereby, and a latch carried by the first named arm and movable into and out of engagement with said pawl.

8. In combination with a nozzle for delivering fluid to can ends supported on a chuck, a valve in the nozzle, an arm pivotally mounted adjacent the nozzle and engageable with the valve to open it, a second pivoted arm, means for oscillating said second arm, a pin on said second arm, a pawl adapted to be engaged thereby, and a latch carried by the first named arm and movable into and out of engagement with said pawl and means depending upon a can end being in the chuck for moving the latch into engagement with the pawl.

9. In a device of the character described, a continuously rotating chuck adapted to support and rotate a can end having a non-circular flanges outer edge, means for placing said can end upon the chuck with the major axis pointing in a definite direction in relation to said chuck, a nozzle for delivering a lining compound to said flanged edge, and means supporting said nozzle for radial movement relative to the chuck whereby the nozzle may align with said flanged edge as the can end rotates.

10. In a device of the character described, a table having a recess formed therein, a continuously rotatable lower chuck disposed in said recess with its upper face just below the level of the table, an upper chuck yieldingly mounted in vertical alignment with said lower chuck and adapted to be intermittently rotated, detent means adapted to arrest rotation of the upper chuck in certain predetermined positions, ridges formed in said upper chuck adapted to register with elongated grooved portions of a can end when the major axis of said elongated grooves is definitely positioned relative to the chuck, means for moving can ends one at a time to a position directly over said recess, means for moving the upper chuck downwardly against a can end so positioned, means for raising the lower chuck to lift the can end from the table and cause it to be clamped between both chucks, and means for lowering the lower chuck after the can end has been rotated one and one-half revolutions thereby.

11. In a device of the character described, a continuosly rotating lower chuck adapted to support and rotate a can end having a non-circular flanged outer edge, said chuck being provided with a ridge registering with a groove in said can end when the major axis of said can end has a definite direction relative to the chuck, a nozzle for delivering a lining compound to said flanged edge, means supporting said nozzle for radial movement relative to the chuck whereby the nozzle may align with said flanged edge as the can end rotates, and mechanism for placing non-circular can ends on said continuously rotating lower chuck in the above stated direction, said mechanism comprising an upper chuck yieldingly supported in axial alignment with said lower chuck and provided with a ridge registering with a groove in the can end when the major axis of said can end has a definite direction relative to said upper chuck, detent means for normally retaining said upper chuck in a predetermined position relative to the position in which can ends are fed to the chucks, and means for bringing the lower chuck in engagement with the can end.

12. In a device of the character described, a continuously rotating lower chuck adapted to support and rotate a can end having a non-circular flanged outer edge, said chuck being provided with a ridge registering with a groove in said can end when the major axis of said can end has a definite direction relative to the chuck, a nozzle for delivering a lining compound to said flanged edge, means acting in synchronism with said chuck and supporting said nozzle for radial movement relative to the chuck whereby the nozzle may align with said flanged edge as the can end rotates, and mechanism for placing non-circular can ends on said continuously rotating chuck in the above stated direction, said mechanism comprising an upper chuck yieldingly supported in axial alignment with said lower chuck and provided with a ridge registering with a groove in the end when the major axis of said can end has a definite direction relative to said upper chuck, detent means for normally retaining said upper chuck in a predetermined position relative to the position in which can ends are fed to the chucks, and means for bringing the lower chuck in engagement with the can end.

FRANK KRUEGER.